United States Patent [19]

Franke et al.

[11] 4,084,730

[45] Apr. 18, 1978

[54] MEASURING AND PIPETTING DEVICE

[75] Inventors: Rainer-Burkhard Franke, Heddesheim; Adolf Hirschmann, Heilbronn; Klaus Käser, Weinsberg, all of Germany

[73] Assignee: Labora Mannheim GmbH fur Labortechnik, Mannheim, Germany

[21] Appl. No.: 723,515

[22] Filed: Sep. 15, 1976

[30] Foreign Application Priority Data

Sep. 18, 1975 Germany ............................ 2541642

[51] Int. Cl.² ............................................ G01F 11/06

[52] U.S. Cl. .................................. 222/309; 73/425.6; 222/567

[58] Field of Search ................. 222/49, 309, 386, 322, 222/568, 567; 128/2 F, 278, 218 R, 218 P, 218 PA; 279/15 G, 51; 141/27, 375; 73/425.4 P, 425.6

[56] References Cited

U.S. PATENT DOCUMENTS

| | | | |
|---|---|---|---|
| 3,171,663 | 3/1965 | Stark | 279/51 X |
| 3,343,539 | 9/1967 | Moorhouse | 222/309 X |
| 3,492,876 | 2/1970 | Bull et al. | 222/309 X |
| 3,606,086 | 9/1971 | Drummond et al. | 222/49 |
| 3,766,785 | 10/1973 | Smernoff | 73/426.5 |
| 3,802,608 | 4/1974 | Gullett | 222/309 |
| 3,815,790 | 6/1974 | Allen et al. | 222/309 |

*Primary Examiner*—Robert B. Reeves
*Assistant Examiner*—Fred A. Silverberg
*Attorney, Agent, or Firm*—Woodard, Weikart, Emhardt & Naughton

[57] ABSTRACT

Disclosed is a pipette device which accommodates a detachable filling device and a detachable piston. The stroke length of the piston is determined by the selective engagement of an abutment, movable with the piston, with stepped surfaces cut into a sleeve movable within an enclosing housing. A control member accessible at the housing exterior is angularly shifted to move the sleeve and thus select the step with which the abutment will engage, thereby determining the length of the working stroke of the piston.

8 Claims, 8 Drawing Figures

MEASURING AND PIPETTING DEVICE

BACKGROUND OF THE INVENTION

The present invention is concerned with a device which permits the drawing up and the delivery of liquids by means of piston pipettes to be carried out smoothly, quickly, precisely and without entrainment of liquid residues.

Serial investigations in chemical and medicinal laboratories frequently require laborious pipetting processes in which it must be ensured that even very small amounts of liquid, for example in the range of from 1 micro-liter to 5 milli-liters, can be transmitted quickly and without an excessive amount of care and concentration. The absolute exactitude and the reproducibility which can be achieved must not be smaller than those which are achieved in the measurement of large volumes, i.e., up to about 1% for the absolute exactitude and up to about 0.5% for the reproducibility. It must be possible to carry out the most varied pipetting processes rapidly and in succession without amounts of substance being entrained from the preceding measurement. When working with liquid media which pose special problems because of danger to health, for example infectious or radioactive liquids, care must also be taken to avoid human contact with those parts of the devices which come into contact with such liquids.

The devices which are commercially available and which are described, for example, in U.S. Pat. Nos. 3,606,086 and 3,815,790, certainly go a long way to meeting these requirements but, nevertheless, they still suffer from serious deficiencies. Thus, in particular, the precision and reproducibility of all the known devices leave something to be desired. Furthermore, the precisely-operating devices are laborious to use, for example, with regard to adjustment, alteration of the piston stroke and the exchange of parts of the device.

It is an object of the present invention to overcome the above-mentioned deficiencies of the previously known devices.

Thus, according to the present invention, there is provided a measuring and pipetting device with a detachable filling device attached thereto, which can be a capillary tube or an extension tip, based on the piston principle, with a device for the fixed adjustment of various stroke lengths and/or an adjusting device and/or an exchangeable piston unit, wherein the device for the adjustment of the stroke length is a tubular-shaped, stepped distance piece and/or the piston unit is exchangeably fixed with respect to a piston wire by screwing a threaded tubular bolt over a gripping collet. The adjustment device is constructed in such a manner that the piston unit and the filling device may be relatively adjusted so that when the filling device takes the form of a capillary tube, the piston tip is approximately even with a ring mark on the secured capillary tube when the piston unit is in the starting position, and when the filling device takes the form of an extension tip, the piston tip impinges against a formed stop in the secured extension tip when the piston unit is pressed through.

In the case where a capillary tube forms the filling device the distance from the starting ring mark on the tube to the capillary tube end preferably corresponds to the maximum stroke volume. The capillary tube can be secured with the help of a screw cap and of a clamping ring. The extension tip can be pushed over a sleeve with a bead and can be secured with the help of a screw cap.

The advantages which can be achieved by means of the present invention are, in particular, an extension of the field of use because of the improved and simplified adjustment and tip attachment which can be accomplished without the use of any kind of auxiliary tools. The device according to the present invention also provides an improved volume tolerance and reproducibility and its stepped construction permits a rapid volume adjustment as may be required in some uses of the device. Due to the improvements provided, the device can also be used in immulogical laboratories where it is necessary to work with especially small volumes and with a very high degree of precision. Furthermore, the danger of glass breakage and a danger of infection are substantially overcome.

For a better understanding of the present invention, one embodiment thereof will now be described in more detail, with reference to the accompanying drawings, in which:

DESCRIPTION OF THE PREFERRED EMBODIMENTS

Figures 1, 2:
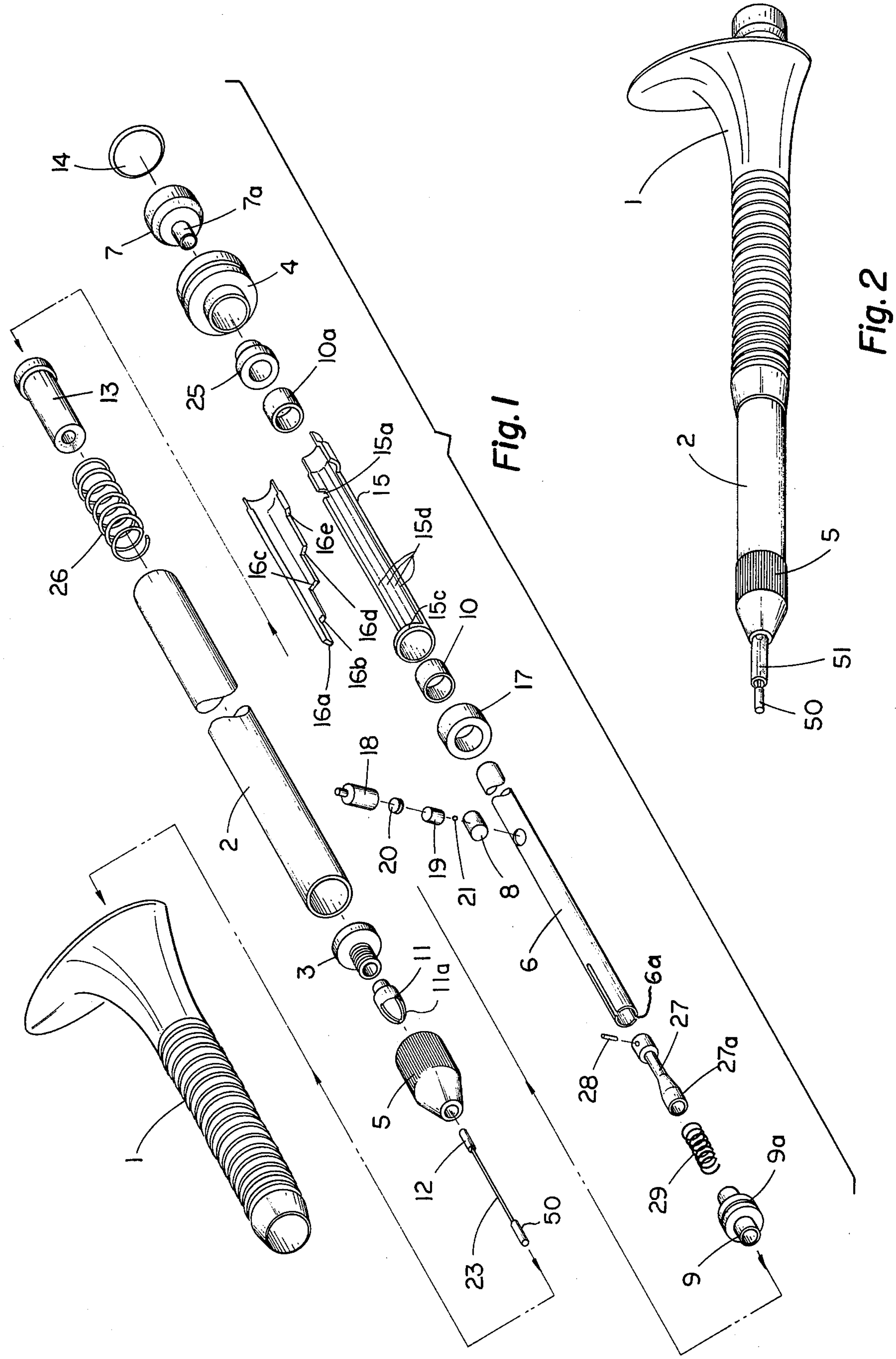
FIG. 1 is an exploded view of the device.
FIG. 2 is a perspective view of the assembled device shown in FIG. 1.
Figure 4:
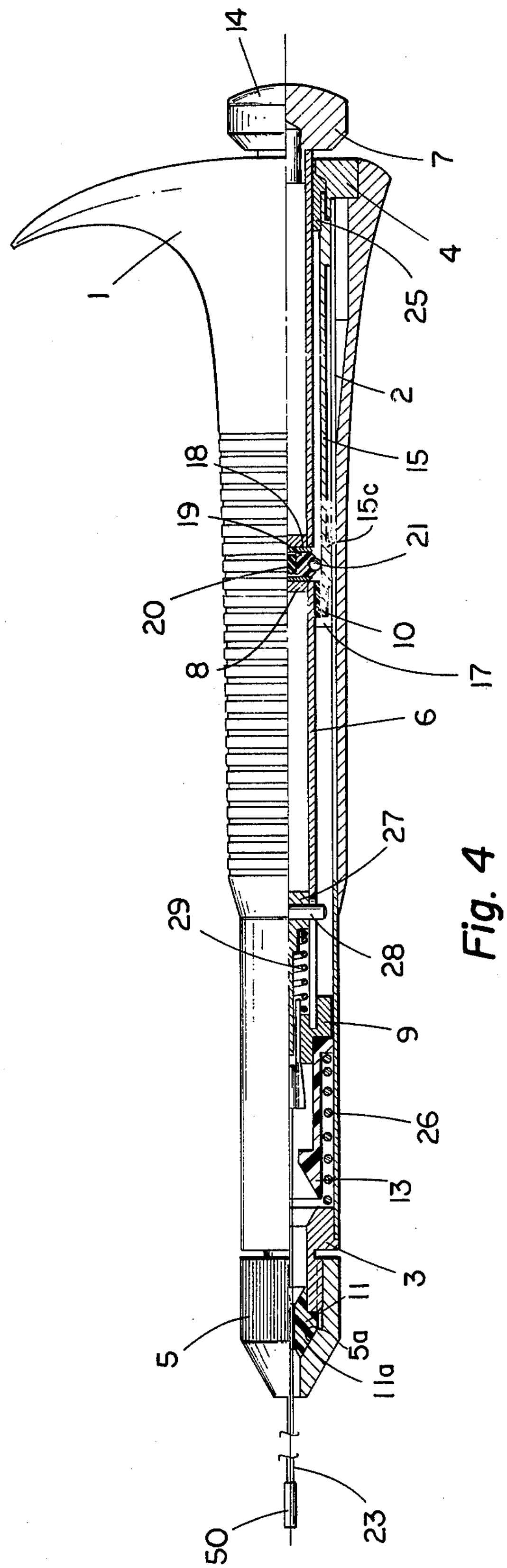
FIG. 4 is a side view, partially in section, of the assembled device shown in FIGS. 1 and 2.

Referring now to FIG. 2, the external construction comprises a grip sleeve 1 with a curved holding member, preferably made from an injection molded synthetic resin, which is pushed over a guide bearing or housing 2 and is connected with an end piece 4 by form-closure. On the lower end of the guide bearing 2 there is placed a screw socket member 3 upon which, in turn, is screwed a cap 5 having a central bore, a portion of which is defined by the conical surface 5*a* (FIG. 4) for clamping a capillary tube, fragmentarily shown at 51 in FIG. 2. Between the screw cap 5 and the screw socket 3 and seated on the end of the socket 3, there is a clamping ring 11, which preferably is made of a synthetic resin, for example, a high molecular weight, partially crystalline thermoplastic material, which, when the screw cap is screwed tightly, is resiliently squeezed to secure the capillary tube end. The clamping ring has a conically shaped tip portion 11*a* (FIG. 4) engaged by the conical surface 5*a* of member 5. In the clamping process the filling device or capillary tube must not undergo any movement in an axial direction in order that the position of the filling device relative to the piston is not changed. This objective is achieved by bottoming the member 11 securely upon the screw socket 3. In order to facilitate the insertion into the assembly of the glass capillary tube (identified at 51 in FIG. 2) and of a piston wire extending into the tube (the piston wire is identified at 23 and is part of the piston unit as described in detail hereinafter), the bore of the clamping ring 11 may have a run-in cone (not shown) on the lower end thereof. All external metal constructional parts are preferably protected against oxidation by a galvanic coating.

Through the bore of the screw cap 5 and of the screw socket 3, there runs the wire or stem 23 of the piston unit to a gripping collet 27. The stem 23 carries a tip member 12 of slightly larger diameter which is externally threaded and is received in the internally threaded or serrated bore formed by collet jaws 27*a*, the jaw threads or serrations being indicated at 27*b* in FIG. 6. As may be seen in FIG. 6, the rear end of the collet projects into an inner collar or sleeve 6. The sleeve 6 is attached to the piston unit and moves the piston through its stroke. It has a slotted portion 6*a* adjacent collet 27 and carries, as the opposite terminal element a control member taking the form of milled push button 7 provided with a cap 14.

Figure 6:
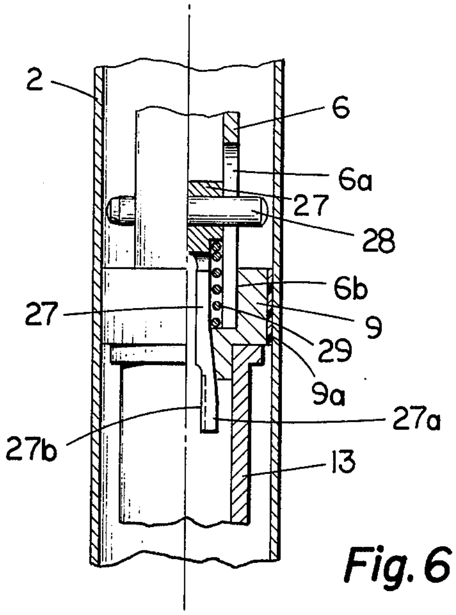
FIG. 6 is an enlarged, fragmentary sectional view of a further portion of the device shown in FIGS. 1 and 2.

As may be seen in FIG. 6, inner sleeve 6, carries a guide ring 9, the ring being rigidly attached to the sleeve 6 along the surfaces identified at 6*b* in FIG. 6. For the reduction of friction and for guide movement within the guide bearing tube or outer housing 2, a synthetic resin shrunk tube 9*a*, preferably made of Teflon, is drawn thereon. The guide ring 9 is so constructed that it can receive the upper end of the piston unit formed by members 12 and 23. This might be accomplished by threading the central bore of ring 9 into which the threaded piston wire tip 12 can be screwed. However, in the preferred embodiment here disclosed, the holding device for the piston unit is in the form of the gripping collet 27 acting with the guide ring 9, a spring 29 and a stop pin 28 positioned behind it. The internally threaded or serrated portion of the collet jaws 27*a* receive the threaded member 12. In open or released position, the collet jaws 27*a* extend beyond the guide ring 9 and their resilience spreads them somewhat to accept the piston portion 12. The shank of the collet is encircled by the compression spring 29. The transverse, stop pin 28 carried by the head of collet 27 rides within the diametrically opposite, longitudinal slots 6*a* in the collar 6. These elements serve to selectively clamp or release the piston unit. To release the collet jaws, the sleeve 6 is pulled upward (as viewed in FIG. 6) beyond the point of engagement of pin 28 with the collar 17 carried on the end of sleeve 15, 16. As this occurs, the pin 28, and collet 27, will remain stationary while sleeve 6 continues its upward motion (as viewed in FIG. 6) compressing spring 29. This results in further extension of collet jaws 27*a* for receiving the piston stem. Return of sleeve 6 downwardly (as viewed in FIG. 6) moves guide ring 9 downwardly and, in effect, draws collet jaws 27*a* into the inclined neck area of the ring 9 thus compressing or clamping the jaws 27*a* around the piston stem portion 12 (FIG. 1).

The exchangeable piston unit, previously mentioned, includes a tip 50, acting as the piston proper, made of synthetic resin and preferably of high molecular weight, partially crystalline, chemically-resistant thermoplastic material, which is sprayed around a wire, the wire preferably having on the rear end thereof, a tip member 12, which may be externally threaded. Between a collar 13 (FIG. 4) and socket member 3 within the housing 2, there is a pressure spring 26 which continuously presses the assembly back into the starting position that is, the position in which the piston is retracted. In order to center and avoid jamming of the pressure spring 26 the collar 13 has a spindle portion which extends into the spring 26. The collar 13 is preferably made of Teflon and the enlarged upper end of the collar receives the lower, reduced end of the guide ring 9.

The inner collar or sleeve 6 extends through an end piece 4 through two bearing collars 10 and 10*a*, which are preferably made of Teflon. The reduced portion 7*a* of the push button 7 extends into the bore of the sleeve 6 and the fit serves to rigidly attach the push button 7 to the sleeve 6 so that angular motion of the push button angularly moves or rotates the sleeve 6. The end piece 4 is aligned by means of a tolerance piece 25.

Figure 5:
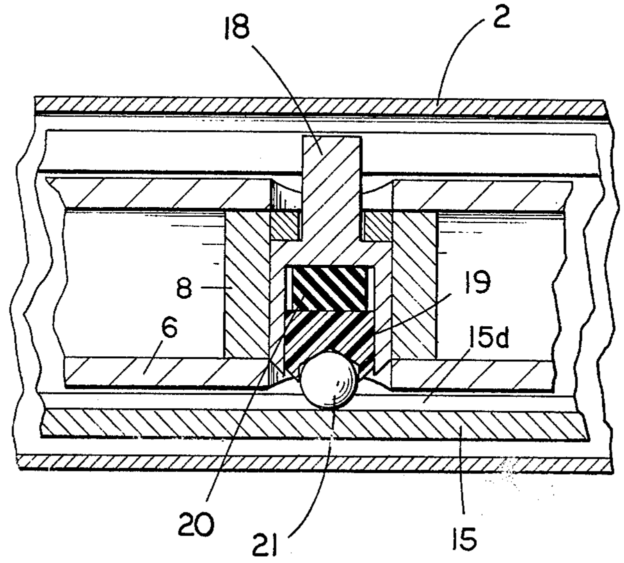
FIG. 5 is an enlarged, fragmentary sectional view of a portion of the device shown in FIGS. 1 and 2.
Figure 7:
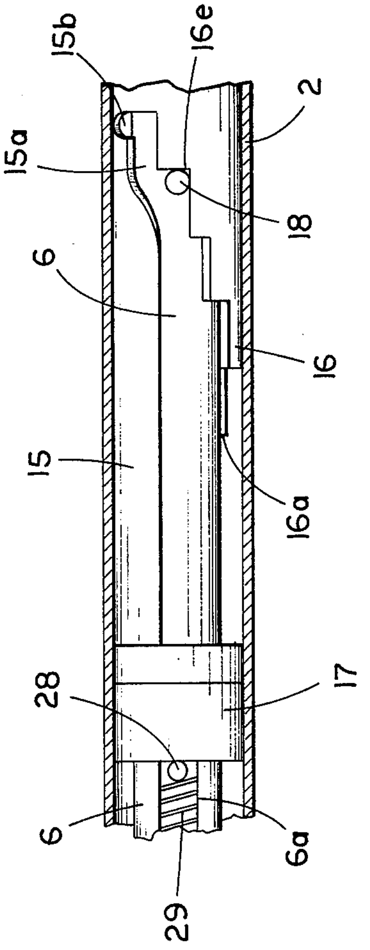
FIG. 7 is a fragmentary, enlarged side view partially in section, showing the assembled relation of certain of the parts of the device shown in FIGS. 1 and 2.

Above the guide ring 9 and between the mounting collars 10 and 10*a*, there sits a two-part distance piece or stepped sleeve 15, 16, whose segmented upper end portions slip into and are secured by suitable adhesive to end piece 4. As may be seen in FIG. 4, the top portion of guide tube or housing 2 is secured to and surrounds the adjacent, enlarged collar 15*c* on the sleeve segment 15, the collar 17 surrounding the lower portion of sleeve collar 15. The tube 2 also encloses the exterior surface of the adjacent reduced portion of the end piece 4. The sleeve 15, 16 and the guide bearing tube 2 remain stationary in the operation of the device. The sleeve 6 is thus securely connected to the end piece 4 and the bearing tube 2 and moves axially in the bearing collars 10 and 10*a*. The inner surface of sleeve segment 15 is provided with longitudinal, parallel grooves 15*d* (FIGS. 1 and 5). Sleeve 15, 16 has a stepped construction forming spaced abutments 16*a*, 16*b*, 16*c*, 16*d* and 16*e*. As may best be seen in FIG. 7, the sleeve portion 15 is shaped to provide a groove portion 15*a*, which extends beyond the final step abutment 16*e* merging into step abutment 15*b*. A transverse pin 18 selectively engages one of the steps or abutments depending upon the angular position of sleeve 6 with relation to the stationary sleeve formed by the two sleeve segments 15 and 16. The guide mechanism for pin 18 is shown in detail in FIG. 5 and comprises a reinforcing bolt 8 which is inserted into the inner collar 6. Through a transverse bore in the parts 6 and 8 are inserted the ball 21, an elastomeric ball holder 19, a thrust piece 20 and the stop pin 18. The elastomeric thrust piece 20 resiliently urges the ball 21 outwardly into the appropriate one of the grooves 15*d*. The ball rides against the inner surface the selected groove 15*d* in the interior surface of tube segment 15 and the pin 18 engages the step with which it is selectively aligned. The thrust member 20 permits a slight retraction of ball 21 as it rides over the lands between grooves 15*d*, and seating of the ball in the grooves provides detent positioning of the pin 18 with respect to alignment with the selected one of steps 16*a*-16*e*. A detent position is thus established for each position of inner sleeve 6 as it registers with the volume markings on the housing end piece 4 (FIG. 8).

Figure 8:
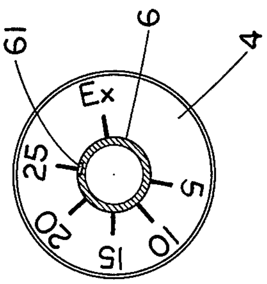
FIG. 8 is a plan view of the upper end of the device showing the cooperating index markings identifying the adjusted position of the plunger assembly.

As may be seen in FIG. 8, the end face of member 4 may be provided with quantity identifying index markings and the adjacent outer surface of sleeve 6 may be provided with a reference marking identified at 61 in FIG. 8. With reference mark 61 opposite "25" on member 4, the pin 18 will be in its position of FIG. 7, that is, in engagement with abutment 16*e*. Abutment 16*e* thus defines the outer or retracted limit of motion of the piston that is, the upper limit of its intake stroke, and hence the volumetric displacement of the piston when it is moved through its working stroke by depressing the button 7. Engagement of pin 18 with the end portion 15c (FIG. 1) of sleeve 15 defines the downward or working stroke limit for all piston displacements. As will be evident from FIG. 7, step 16e provides a maximum volume stroke, corresponding to the "25" marking on member 4 (FIG. 8). Step 16a provides the minimum volume stroke, corresponding to the "5" marking on member 4 and the other steps correspond to the markings intermediate between the "25" and "5" markings. By varying the number of steps and the axial distance between steps various volumes can be obtained in addition to the five volume capacities characteristic of the form of the assembly shown. The volumetric capacity for the particular use of the assembly is, of course, selected by rotating button or knob 7 until the reference index 61 (FIG. 8) is opposite the desired quantity marking on member 4. Pin 18 will then abut the proper step on sleeve 15, 16 and detenting of ball 21 in the groove 15d diametrically opposite the pin 18 assures that the pin 18 is properly centered on the selected sleeve step.

In addition, the groove 15a and step 15b (FIG. 7) provide a means for releasing the collet 27. This operation is achieved by turning the milled button 7 until mark 61 is opposite the "Ex" marking on member 4 freeing the pin 18 from the step with which it is engaged (for example step 16e in FIG. 7). Knob 7 is then pulled outwardly and as pin 18 enters groove 15a, the pin 28 will engage stationary collar 17. Further outward movement of button 7 (and consequently sleeve 6) causes member 9 to move upwardly (as viewed in FIG. 6) with relation to the collet jaws 27a, allowing the jaws to expand outwardly as previously mentioned with reference to FIG. 6. This releases the piston member 12 for removal from the collet 27. A slight additional angular movement of knob 7 past the "Ex" position (FIG. 8) on member 4 places pin 18 on the step 15b and retains the collet 27 in unlocked or released position. When the sleeve 6 is turned back from the "Ex" position, by turning knob 7, and pushed inwardly the collet jaws 27a are reclosed by the downward motion of collar 9. Single handed adjustment of the volume capacity can be accomplished by grasping the knurled knob between thumb and forefinger while the remaining fingers of the hand grip the body or shank of the assembly, the detent position at each setting being easily felt because of the action of ball 21 in grooves 15d.

The piston unit is held free of play by the course of the thread in the bore of the gripping collet, reproducibility thereby being ensured. For the ejection of the used pipette and piston unit system, the milled button 7 is again brought into the above-described "Ex" or unlocked position provided for this purpose and pulled out. The gripping collet hereby opens again. If, at the same time, the screw cap 5 is loosened, then, by simple shaking, the piston, together with the drawn-on capillary tube or the extension tip, slip away forwardly. In this way, a contact-free ejection of the piston unit and the filling device is possible. The working or discharge stroke of the piston is accomplished by depressing the push button 7 to the bottom limit of its motion against the force of spring 26.

The adjustment between the piston tip and the capillary tube is carried out as follows: first the piston tip 12 is secured in the gripping collet 27, as described above, then the capillary tube is pushed over the piston tip 50 and in through the bore of the screw cap 5 and of the screw socket 3. On its outer circumference, the glass tube is provided with a ring mark which is, by visual control, exactly positioned with reference to the piston 50. Holding in this position is achieved by firmly screwing down the screw cap 5 which squeezes the conical tip 11a of the clamp ring 11 against the capillary tube. Since the piston tip 50, when extended, terminates at about the end of the capillary tube, the dead volume effect is eliminated and a volume exactitude of ± 1% is obtained.

Figure 3:
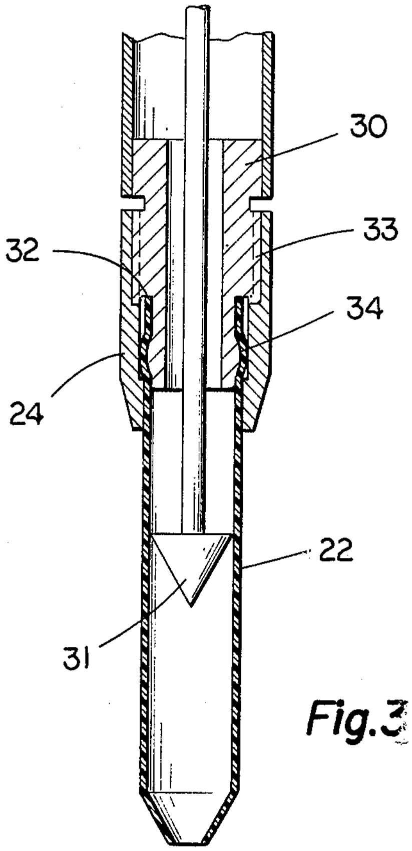
FIG. 3 is a diagrammatic view of an extension tip which can be used in conjunction with a modified form of the present invention.

For volumes of about 100–20,000 micro-liters and preferably of 125–5,000 micro-liters, it is advantageous to use an extension tip such as illustrated in the modified form of the invention shown in FIG. 3. The extension tip 22, preferably formed of a liquid repellent synthetic resin, one end has the shape of the piston 31 (in the present case shown as conical). The extension tip, after loosening the screw cap 24, is pushed over a bead 34 on a collar 30 up to a stop on a flange 32 of the collar. By pressing down on the piston 31, the synthetic resin tip 22 is automatically again pressed somewhat downwardly so that form-closure between the cone-shaped surface of the piston and the extension tip is assured. In this state, the screw cap 24 is securely drawn over thread 33, a jamming effect against the extension tip which, thus, is secured in place. Adjustment of the volume is provided by adjustment of the stroke limit of the piston 31 as described with reference to the primary embodiment.

In order to be able to carry out the pipetting of volumes of various sizes without having to change the device, different kinds of extension tips can be employed the shape of these varying in such a manner that the diameter of the upper part to be securely fixed over the bead is, in every case, of uniform size but the lower part, which determines the piston guiding, is correspondingly tapered.

A color code on the ring marked pipette tube and on the pressure button 7 may be utilized to avoid a false correlation of pipette and device.

We claim:

1. A measuring and pipetting device comprising an elongated tubular housing, a control member at one end of said housing movable angularly about the central longitudinal axis of the housing and parallel thereto in an intake stroke and a working stroke, attaching means carried on the other end of said housing for releasably clamping a filling device into register with the housing bore, a piston member having a stem extending from said other housing end and into the attached filling device, an elongated member carrying a transverse abutment within said housing and attached to said control member, said elongated member being movable parallel to and angularly about the central longitudinal axis of said housing as said control member is correspondingly moved, further attaching means carried by said elongated member for holding said piston stem within the housing, a sleeve fixed within said housing and having a series of longitudinally spaced abutments each spaced angularly from the other about the sleeve wall, said longitudinally spaced abutments each being adapted to selectively engage said transverse abutment on the elongated member depending upon the angular position of said control member, said further attaching means including clamping elements for retaining said piston stem and a guide ring acting thereon to hold the clamping elements in piston stem retaining position, cooperating elements on said attaching means and on said fixed sleeve for removing the clamping force of said guide ring when said control member is pulled outwardly parallel to the housing axis a predetermined distance, and said fixed sleeve having a longitudinal slot extending beyond the abutment most remote from the piston member, said slot accommodating said transverse abutments and defining said predetermined withdrawal distance necessary to remove said clamping force.

2. A measuring and pipetting device as claimed in claim 1 in which said extending longitudinal slot is offset angularly from said most remote abutment so that said control member must be first moved angularly before it can be moved through said predetermined withdrawal distance necessary to remove said clamping force.

3. A hand-operated measuring and pipetting device comprising a tubular housing and a piston assembly within the housing coaxial therewith and movable angularly about the central longitudinal axis of the housing and parallel thereto in an extending and retracting piston stroke, a capillary tube attached to one end of said housing, said piston assembly having a piston head extending into said capillary tube, a stationary sleeve within the housing carrying radially arranged abutments, said piston assembly carrying a radially extending stop pin and selectively engageable with said abutments to thereby adjustably limit the retracting stroke of the piston head, the interior surface of said stationary sleeve being provided with longitudinal grooves and said piston assembly carrying a member extending diametrically opposite said stop pin and resiliently pressed into a selected one of said grooves depending upon the stop pin position, said piston head at the limit of its extension from said housing in its extending stroke being flush with the free end of said capillary tube.

4. A measuring and pipetting device comprising an elongated tubular housing, a control member at one end of said housing concentric with and movable angularly about the central longitudinal axis of the housing and parallel thereto in an intake stroke and a working stroke, attaching means carried on the other end of said housing for releasably clamping a filling device into register with the housing bore, a piston member having a stem extending from said other housing end and into the attached filling device a predetermined distance, an elongated member carrying a transverse abutment within said housing and attached to and concentric with said control member, said elongated member being movable parallel to and angularly about the central longitudinal axis of said housing as said control member is correspondingly moved, further attaching means carried by said elongated member for holding said piston stem within the housing, a sleeve fixed within and coaxial with said housing and having a series of longitudinally spaced abutments each spaced angularly from the other about the sleeve wall and each facing toward said piston member, said longitudinally spaced abutments each being adapted to selectively engage said transverse abutment on the elongated member depending upon the angular position of said control member, thereby selectively defining differing outer limits of travel of said piston member and hence the volumetric displacement achieved by the piston member within said filling device when the control member is moved through its working stroke, said elongated member carrying a transverse member resiliently urged against the inner surface of said sleeve, said sleeve having a series of longitudinal grooves in its inner surface corresponding to said series of abutments on said sleeve, the grooves being adapted to accomodate said transverse member to provide detent positioning of said transverse abutment in alignment with the selected one of said longitudinally spaced abutments.

5. A measuring and pipetting device as claimed in claim 4 in which said transverse member is axially aligned with and diametrically opposite said transverse abutment on said elongated member.

6. A measuring and pipetting device as claimed in claim 5 in which said transverse member takes the form of caged ball free to rotate about its own center and presenting a spherical surface to said grooves.

7. A measuring and pipetting device as claimed in claim 4 in which said filling device takes the form of a capillary tube and said attaching means for the filling device comprises a tubular socket member attached to said other end of the housing, a clamping ring seated in said socket member and having a resiliently deformable conically shaped tip portion protruding from the socket member, a cap member adjustably positioned on said socket member, said cap member having a central bore and a conical inner surface defining a portion thereof, whereby with the capillary tube extending into the central bore of said cap member and into the deformable tip portion of the clamping ring, the drawing down of the cap member on said socket member engages their conical surfaces to deform said socket member tip portion into clamping engagement with the capillary tube.

8. A measuring and pipetting device as claimed in claim 7 in which said socket member is externally threaded and said cap member is internally threaded to provide for said adjustable positioning of the cap member on the socket member.

* * * * *